3,107,230
PROCESS FOR IMPROVING THE LIGHT FASTNESS OF CHLOROBUTADIENE POLYMERS
Hugo Malz and Anton Robert Heinz, Leverkusen, and Willi Wolff, Cologne-Mulheim, Germany, assignors to Farbenfabriken Bayer Aktiengesellschaft, Leverkusen, Germany, a corporation of Germany
No Drawing. Filed July 27, 1960, Ser. No. 45,563
Claims priority, application Germany July 30, 1959
5 Claims. (Cl. 260—45.9)

Polymers and co-polymers of 2-chloro-butadi-1,3-ene and vulcanizates and unvulcanised mixtures containing these compounds gradually become discoloured on exposure to light. This effect is probably due to an oxidation catalyzed by light. The discoloration is undesired in many cases and impairs the utility of these polymers in many fields of application. It has not so far been possible sucessfully to prevent or even to reduce such discoloration to a tenable degree.

It has now been found that compounds of the general Formula I $$R-SO_2-N=P(-X-R')_3 \qquad (I)$$

in which X represents an oxygen or sulphur atom and R and R', which may be the same or different, each represent a substituted or unsubstituted alkyl, cycloalkyl, aryl, aralkyl or alkaryl radical and wherein R can also represent a monosubstituted or disubstituted—preferably lower alkyl substituted—amine radical are suitable for use as stabilizers for improving the light fastness of polychlorobutadiene and copolymers derived from chlorobutadiene. The alkyl radicals are preferably lower alkyl radicals containing up to 6 carbon atoms.

The production of compounds of the aforementioned general formula forms, inter alia, the subject of the following publications: A. W. Kirsanov, Nachrichten der Akademie der Wissenschaften, USSR (1952), page 710; A. W. Kirsanov and R. T. Makita, Zeitschrift für obsc. chim. 27, page 245 (1957); A. W. Kirsanov and Z. D. Nekrasowa, Zeitschrift f. obsc. chim. (1957), page 1253; A. W. Kirsanov and V. I. Sevcenko, Zeitschrift f. obsc. chim. 26, page 504 (1956).

The compounds employed in the process according to the present invention may contain for example hydroxy, halogen, nitro, amino, ether or thioether radicals as substituents in the radicals R and R'.

Preferred compounds for employment in the process according to the present invention are those of the general Formula I in which the radical R is one of the following:

$CH_3-$, $Cl-CH_2-$, $Cl_3C-$,

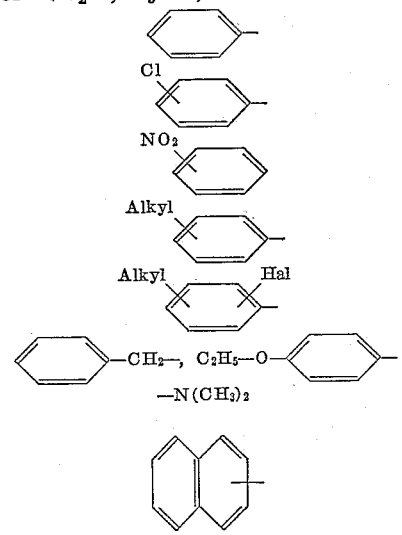

and

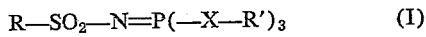

The alkyl radicals are preferably lower alkyl radicals containing up to 6 carbon atoms. The radical R', which may be the same as the radical R, is preferably one of the following radicals:

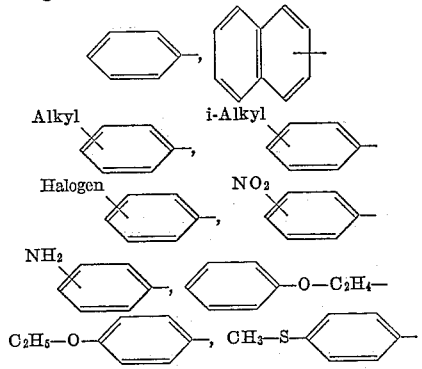

The number of the carbon atoms in the alkyl radicals is not restricted. There can be used alkyl radicals having up to 12 or more e. g. 20 carbon atoms.

From the large number of such compounds, only a few will be mentioned here by way of example:

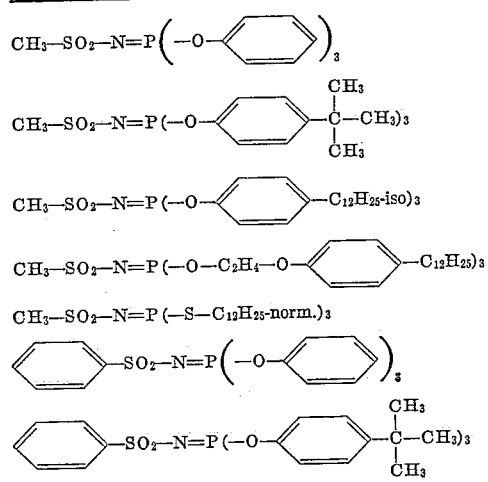

| | |
|---|---|
| | M.P. 86° C. |
| | M.P. 129° C. |
| | Light brown oil. |
| | Light yellow viscous oil. |
| | Do. |
| | M.P. 87° C. |
| | M.P. 104° C. |

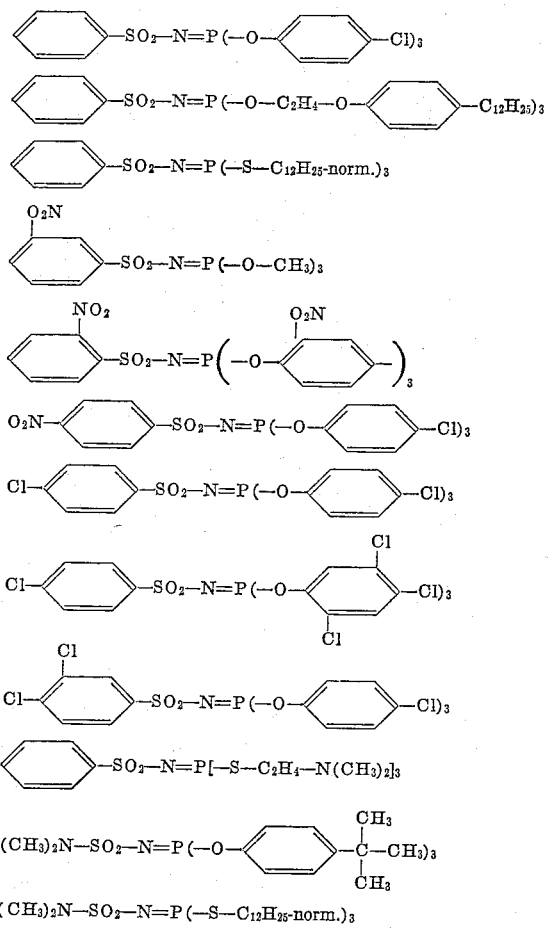

| Compound | |
|---|---|
| ⌬—SO₂—N=P(—O—⌬—Cl)₃ | M.P. 114° C. |
| ⌬—SO₂—N=P(—O—C₂H₄—O—⌬—C₁₂H₂₅)₃ | Brown oil. |
| ⌬—SO₂—N=P(—S—C₁₂H₂₅-norm.)₃ | Light yellow viscous oil. |
| O₂N-⌬—SO₂—N=P(—O—CH₃)₃ | M.P. 59° C. |
| (NO₂)⌬—SO₂—N=P(—O—⌬—O₂N)₃ | M.P. 141° C. |
| O₂N—⌬—SO₂—N=P(—O—⌬—Cl)₃ | M.P. 153° C. |
| Cl—⌬—SO₂—N=P(—O—⌬—Cl)₃ | M.P. 104° C. |
| Cl—⌬—SO₂—N=P(—O—⌬(Cl,Cl))₃ | M.P. 153° C. |
| Cl,Cl—⌬—SO₂—N=P(—O—⌬—Cl)₃ | M.P. 97° C. |
| ⌬—SO₂—N=P[—S—C₂H₄—N(CH₃)₂]₃ | Brownish oil. |
| (CH₃)₂N—SO₂—N=P(—O—⌬—C(CH₃)₃)₃ | Light brown oil. |
| (CH₃)₂N—SO₂—N=P(—S—C₁₂H₂₅-norm.)₃ | Light yellow oil. |

For improving the fastness to light, the aforementioned compounds are added to the rubber in quantities of from 0.01 to 5% by weight (based on the weight of the solid rubber). The admixture is effected either on a roller or in an internal kneader or in the latex condition in the form of a conventional dispersion or emulsion. A better distribution of the compound in the rubber is obtained by admixing the compound with the rubber latex. It has been found that in this way the conditions for working up the polychlorobutadiene latex to the solid material are not influenced. The addition of the aforementioned compounds does not cause any lowering of the technical rubber values or any reduction in the workability and spraying capacity of the mixtures. The process according to the present invention enables a lightfast polychlorobutadiene rubber to be produced without any changes in the polymerization conditions, i.e. the introduction of phenthiazine or other amines (or phenols) which are preferably employed when the polymerization is carried out on a commercial scale or when the polymerization mixtures are being stopped, and which in general have an unfavorable effect on the color of the rubber. The addition of the aforementioned compounds not only cancels out the discoloring influence of the amines or phenols but results in a light-stabilizing action.

The parts given in the following examples are by weight.

EXAMPLE 1

100 parts of 2-chlorobutadi-1,3-ene, containing 0.1 part of phenthiazine, are emulsified after addition of 0.35 part of n-dodecyl mercaptan with a solution of 4 parts of the sodium salt of disproportionated abietic acid, 0.7 part of the sodium salt of the condensation product of naphthalene, sulphuric acid and formaldehyde, and 0.8 part of caustic soda in 120 parts of water and brought to the reaction temperature of 45° C. The polymerization is thereafter initiated by adding 0.3 part of formamidine sulphinic acid; it leads after three hours to a yield of 70%, whereupon the residual 2-chlorobutadi-1,3-ene is distilled off in vacuo at about 35–40° C.

Samples of this polychlorobutadiene latex have added thereto different quantities (see table) of the stabilizer of the formula

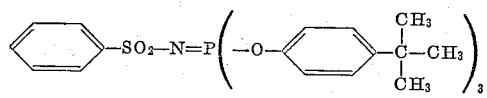

and thereafter are worked up in the usual manner by freeze coagulation. The technical rubber testing of the polymer shows no changes in the essential properties, such as plasticity, storability, solubility, etc., as is clear from the following table:

(The first number gives the Defo hardness and the second number the Defo elasticity, measured according to DIN 53514.)

Table 1

[Parts of stabilizer per 100 parts of polychlorobutadiene]

|  | 0 | 1 | 2 | 3 |
|---|---|---|---|---|
| Plasticity (Defo 80° C.) | 400/17 | 450/17 | 400/14 | 430/18 |
| Storability 70° C. (Defo 80° C.): | | | | |
| 0 d | 400/17 | 450/17 | 400/14 | 430/18 |
| 3 d | 380/18 | 470/20 | 420/16 | 400/18 |
| 6 d | 480/20 | 490/20 | 430/21 | 500/21 |
| 9 d | 570/26 | 550/24 | 500/28 | 620/23 |
| Solubility 1% in cyclohexanone | (¹) | (¹) | (¹) | (¹) |

¹ Satisfactory.

Testing of the mechanical properties of a conventional test mixture, consisting of 100 parts of polychlorobutadiene
30 parts of thermal carbon black
0.5 part of stearic acid
0.6 part of paraffin
2.0 parts of phenyl-α-naphthylamine
4.0 parts of magnesium oxide
5.0 parts of zinc oxide
0.5 part of ethylene thiourea shows no unfavorable influence on the physical values of the vulcanizate upon admixture of the stabilizer, as shown by the following table:

*Table 2*

| Parts of stabilizer per 100 parts of rubber | Workability | Strength, kg./cm.² | (Shore hardness, 25° C. | Elasticity at 25° C., percent | Modulus 300%, kg./cm.² |
|---|---|---|---|---|---|
| 0 | Good | 178 | 52 | 52 | 36 |
| 1 | do | 180 | 52 | 52 | 36 |
| 2 | do | 176 | 51 | 52 | 34 |
| 3 | do | 186 | 51 | 51 | 36 |

Testing of the discoloration in a test mixture consisting of 100 parts of polychlorobutadiene
40 parts of titanium dioxide of high covering power
2 parts of paraffin
0.5 part of stearic acid
2 parts of non-discoloring alkyl phenols
4 parts of magnesium oxide
5 parts of zinc oxide
0.5 part of ethylene thiourea shows the following pattern in the vulcanizate when the stabilizer is added in different quantities:

*Table 3*

NATURE OF DISCOLORATION

| Testing method | Parts of stabilizer per 100 parts of polychlorobutadiene | | | |
|---|---|---|---|---|
| | 0 | 1 | 2 | 3 |
| Xenon lamp: | | | | |
| 0 hour | None | None | None | None. |
| 40 hours | Slight | do | do | Do. |
| 180 hours | Strong | Slight | do | Do. |
| 200 hours | Dark | do | Slight | Do. |
| 300 hours | do | Strong | do | Slight. |
| Daylight: | | | | |
| 0 day | None | None | None | None. |
| 7 days | Slight | do | do | Do. |
| 14 days | Strong | do | do | Do. |
| 28 days | Dark | Slight | do | Do. |
| 56 days | do | do | Slight | Do. |

EXAMPLE 2

100 parts of polychlorobutadiene, which have been distinctly given a dark discoloration in a discoloration test according to Example 1, are provided on a roller with 1 part by weight of the stabilizer having the formula $$CH_3-SO_2-N=P(-S-C_{12}H_{25}\ norm.)_3$$

and admixed with 40 parts of titanium dioxide of high covering power 2 parts of paraffin
0.5 part of stearic acid
2 parts of non-coloring alkyl phenols
4 parts of magnesium oxide
5 parts of zinc oxide
0.5 part of ethylene thiourea The mixture is then vulcanized and the discoloration tested under the action of light:

*Table 4*

NATURE OF DISCOLORATION

| Testing method | Parts of stabilizer per 100 parts of polychlorobutadiene | | | |
|---|---|---|---|---|
| | 0 | 1 | 2 | 3 |
| Xenon lamp: | | | | |
| 0 hours | None | None | None | None. |
| 40 hours | Slight | do | do | Do. |
| 100 hours | Strong | Slight | Slight | Slight. |
| 200 hours | Dark | Strong | do | Do. |
| 300 hours | do | do | do | Do. |
| Daylight: | | | | |
| 0 days | None | None | None | None. |
| 7 days | Slight | do | do | Do. |
| 14 days | Strong | Slight | do | Do. |
| 28 days | Dark | do | Slight | Slight. |
| 56 days | do | do | do | Do. |

The same result is obtained if

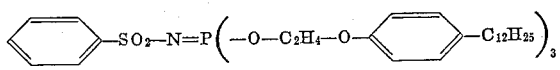

is used as stabilizer.

EXAMPLE 3

A mixture of 90 parts of 2-chlorobutadiene and 10 parts of 2,3-dichlorobutadi-1,3-ene, containing 0.1 part of phenthiazine, is mixed with n-dodecyl mercaptan as in Example 1 and emulsified. The polymerization is carried out with 0.25 part of formamidine sulphinic acid as catalyst. With a conversion of 65%, the polymerization is terminated by cooling and the residual monomer degassified in the usual manner.

Samples of the latex which is obtained are mixed with 2 parts by weight of stabilizer per 100 parts of rubber and worked up by freeze coagulation.

*Table 5*

| | Discoloration with exposure by a Xenon lamp after— | | | | |
|---|---|---|---|---|---|
| | 0 hours | 40 hours | 100 hours | 200 hours | 300 hours |
| Without additive | None | Slight | Strong | Dark | Dark. |
| Compound A | do | None | Slight | Slight | Slight. |
| Compound B | do | do | None | do | Do. |
| Compound C | do | do | Slight | do | Strong. |
| Compound D | do | do | None | do | Do. |
| Compound E | do | do | do | do | Slight. |

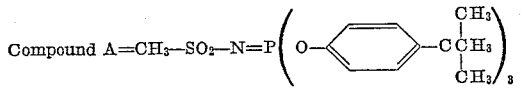

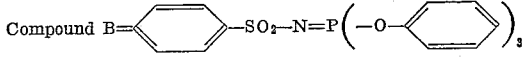

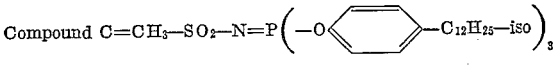

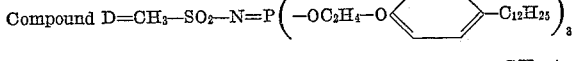

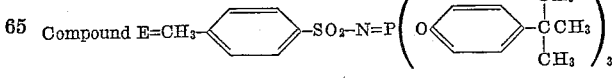

We claim:
1. A process for improving the light fastness of a solid polymer selected from the group consisting of polychlorobutadiene and copolymers of chlorobutadiene by incorporating therein 0.01–5% by weight, based on the weight of the solid polymer, of a stabilizer having the general formula

$$R-SO_2-N=P(-X-R')_3$$

wherein X represents a member selected from the group consisting of oxygen and sulfur and R and R' each represent a member selected from the group consisting of alkyl, cyclohexyl, aryl, and aralkyl, and cyclic radicals from the aforesaid group which are substituted by a substituent selected from the group consisting of halogen, nitro, amino, alkoxy, thioalkyl, and alkyls of up to 12 carbon atoms, and wherein R further represents a member selected from the group consisting of a monosubstituted and a disubstituted amine radical, the substituents of which are lower alkyl.

2. Solid polymers selected from the group consisting of polychlorobutadiene and copolymers of chlorobutadiene which are stabilized by the incorporation therein of 0.1–5% by weight, based on the weight of the solid polymer, of a stabilizer compound of the general formula $$R-SO_2-N=P(-X-R')_3$$

wherein X represents a member selected from the group consisting of oxygen and sulfur and R and R' each represent a member selected from the group consisting of alkyl, cyclohexyl, aryl, and aralkyl, and cyclic radicals from the aforesaid group which are substituted by a substituent selected from the group consisting of halogen, nitro, amino, alkoxy, thioalkyl, and alkyls of up to 12 carbon atoms, and wherein R further represents a member selected from the group consisting of a monosubstituted and a disubstituted amine radical, the substituents of which are lower alkyl.

3. Process as claimed in claim 1 wherein a compound of the formula

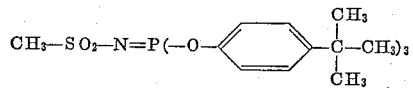

is used.

4. Process as claimed in claim 1 wherein a compound of the formula

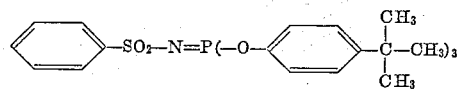

is used.

5. Process as claimed in claim 1 wherein a compound of the formula

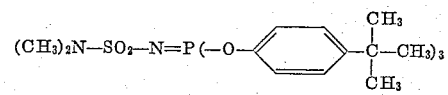

is used.

References Cited in the file of this patent

UNITED STATES PATENTS

| | | |
|---|---|---|
| 1,967,860 | Carothers et al. | July 24, 1934 |
| 2,419,736 | Sloan | Apr. 26, 1947 |